United States Patent [19]
Ragland et al.

[11] Patent Number: 4,769,513
[45] Date of Patent: Sep. 6, 1988

[54] SPLICE CLOSURE SYSTEM

[75] Inventors: Glen W. Ragland, Dunwoody; Bobby Simonton, Carrollton; Phillip J. Snoke, Atlanta; Kenneth D. Timmerman, Smyena, all of Ga.; Christian A. M. Debbaut, Cary, N.C.; Keith Dawes; Whit G. Halstead, both of Raleigh, N.C.; Lowell Koht, Cary, N.C.

[73] Assignee: Raychem Corporation, Menlo Park, Calif.

[21] Appl. No.: 71,553

[22] Filed: Jul. 9, 1987

Related U.S. Application Data

[63] Continuation of Ser. No. 873,012, Jun. 10, 1986, abandoned.

[51] Int. Cl.$^4$ ............................................. H02G 15/08
[52] U.S. Cl. .................... 174/23 R; 174/11 R; 174/76; 174/92; 174/93; 174/DIG. 8
[58] Field of Search ............... 174/11 R, 23 R, 22 R, 174/91, 92, 93, 76, 110 F, 84 R, DIG. 1

[56]          References Cited
        U.S. PATENT DOCUMENTS

| 2,967,795 | 1/1961 | Bollmeier et al. | 174/84 R |
|---|---|---|---|
| 3,361,605 | 1/1968 | Gilbert | 174/84 R |
| 3,422,211 | 1/1969 | Brisse et al. | 174/22 R |
| 3,624,594 | 11/1971 | Trimble | 174/DIG. 8 X |
| 3,781,461 | 12/1973 | Thompson et al. | 174/93 |
| 3,836,694 | 9/1974 | Kapell | 174/23 R X |
| 3,895,180 | 7/1975 | Plummmer | 174/76 X |
| 4,013,924 | 3/1977 | Christensen et al. | 174/11 R X |
| 4,181,775 | 1/1980 | Corke | 174/DIG. 8 X |
| 4,347,402 | 8/1982 | Reyners | 174/93 X |
| 4,424,412 | 1/1984 | Goetter et al. | 174/93 X |
| 4,450,318 | 5/1984 | Scardina et al. | 174/76 X |
| 4,466,843 | 8/1984 | Shimirak | 174/23 R X |
| 4,468,536 | 8/1984 | Van Noten | 174/92 |
| 4,504,699 | 3/1985 | Dones et al. | 174/76 X |

FOREIGN PATENT DOCUMENTS

| 1564 | 5/1979 | European Pat. Off. | 174/76 |
|---|---|---|---|
| 0108518 | 5/1984 | European Pat. Off. . | |
| 0153174 | 8/1985 | European Pat. Off. . | |
| 0182199 | 5/1986 | European Pat. Off. . | |
| 1054528 | 4/1959 | Fed. Rep. of Germany | 174/76 |
| 1159536 | 12/1963 | Fed. Rep. of Germany | 174/93 |
| 2005307 | 4/1970 | Fed. Rep. of Germany . | |
| 2051672 | 4/1972 | Fed. Rep. of Germany | 174/23 R |
| 2341112 | 3/1974 | Fed. Rep. of Germany | 174/93 |
| 2637058 | 2/1978 | Fed. Rep. of Germany . | |
| 2926891 | 1/1981 | Fed. Rep. of Germany | 174/11 R |

Primary Examiner—Morris H. Nimmo
Attorney, Agent, or Firm—Herbert G. Burkard

[57] ABSTRACT

There is disclosed a cable closure which includes a central closure body and a pair of end caps preferably made from structural foam situated at each end of the closure body. There is also disclosed a cable block which includes void filling material selectively inserted among the insulated conductors of the cable and a directional control device which consists of a conduit also selectively inserted among the insulated conductors of the cable. Together the cable closure, cable block and directional control device make up the splice closure system. There may also be provided a heat recoverable seal adhesively attached to the cable closure in which case there will also be provided means for preventing milk-off of the seal from the cable closure. finally, there is disclosed a method for forming the cable block.

13 Claims, 3 Drawing Sheets

FIG_1

FIG_2

FIG_3

FIG_4

FIG_5

FIG_6

FIG_7

SPLICE CLOSURE SYSTEM

This application is a continuation of application Ser. No. 873,012, filed June 10, 1986, now abandoned.

BACKGROUND OF THE INVENTION

This invention relates to the field of splice closures and more particularly relates to those splice closures which are suitable for telecommunications applications.

In the telecommunications industry, splice closures may be utilized in a variety of applications including pressurized and unpressurized telephone plant as well as underground, aerial and direct buried applications. No matter what the application, however, all the applications have in common that the splice closure has to be environmentally secure.

The most challenging applications for a splice closure are underground and direct buried applications in which the threat of water is most severe. Various schemes and designs have been proposed to solve the problem of water leakage in these applications. However, none so far is totally satisfactory. The most common method of protecting the underground and direct buried splice is to entirely encapsulate the splice with a urethane or similar encapsulant. While this method is satisfactory in many respects it has the drawbacks that it is messy, it is time consuming, it is physically exhausting and above all reentry of the splice is most difficult. To re-enter the splice, it is necessary to chip away or otherwise remove the cured encapsulant. This is an extremely time consuming and delicate task to accomplish without causing pair damage.

It would be most desirable to be able to protect an underground and direct buried splice without encapsulating it so that re-entry of the splice could be effectuated without much difficulty.

Alternatively, the splice may be protected by pressurizing the splice closure. In this case, encapsulation is unnecessary. However, many splice closures leak after a time so that the splice closure needs to be repaired or replaced.

It would thus be desirable to have an improved pressurized splice closure.

It is thus an object of the invention to provide a splice closure system in which encapsulation of the splice is unnecessary.

It is also an object of the invention to have a splice closure system which as far as practicable is not craft sensitive.

It is a further object of the invention to have an improved pressurized splice closure and a splice closure which will provide effective sealing and protection of splices in unpressurized cables.

These and other objects of the invention will become more apparent after reference to the following description considered in conjunction with the accompanying drawings.

BRIEF SUMMARY OF THE INVENTION

One aspect of the invention relates to the cable closure. The cable closure includes several embodiments. One cable closure comprises a central closure body and a pair of structural foam end caps situated at each end of the closure body. Another cable closure comprises a central closure body, a pair of end caps situated at each end of the closure with each end cap having at least one port for receiving a cable, a heat recoverable seal adhesively attached to at least one port on each of the end caps and means on the seals and the end caps for preventing milk-off of the seals from the ports. The above-described cable closures are suitable for pressurized or non-pressurized applications.

Another aspect of the invention relates to a block for a cable having a plurality of insulated conductors wherein the block comprises void-filling material selectively inserted among the insulated conductors. The block may also contain a directional control device which comprises a conduit selectively inserted among the insulated conductors. The directional control device may be provided as a separate article of commerce. The cable block in another embodiment may comprise void-filling material selectively inserted among the insulated conductors, restraining means for applying a restraining force with respect to the void-filling material and positioned around the void-filling material, a directional control device comprising a conduit selectively inserted among the insulated conductors and proximate to the void-filling material and means for sensing water in proximity to the void-filling material. While the above-described blocks are suitable for pressurized and non-pressurized applications, it is expected that the blocks will find most use in non-pressurized applications.

A further aspect of the invention relates to a splice closure system for a cable having a plurality of insulated conductors. The splice closure system includes several preferred embodiments. One such embodiment comprises a central closure body, a pair of structural foam end caps situated at each end of the closure body, the end caps and closure body defining a volume of space within which a cable is to be spliced, and at least one cable block disposed within this volume with the cable block comprising void filling material selectively inserted among the insulated conductors.

Another embodiment of the splice closure system may comprise a central closure body, a pair of structural foam end caps situated at each end of the closure body with the end caps and closure body defining a volume of space in which the cable is to be spliced and a directional control device disposed within this volume with the directional control device comprising a conduit selectively inserted among the insulated conductors.

A further embodiment of the splice closure system may comprise a central closure body, a pair of end caps situated at each end of the closure body, each end cap having at least one port for receiving a cable with the end caps and the closure body defining a volume of space within which a cable is to be spliced, at least one cable block disposed within this volume with the cable block comprising void-filling material selectively inserted among the insulated conductors, a heat recoverable seal adhesively attached to at least one port on each of the end caps and, finally, means on the seals and the end caps for preventing milk-off of the seals from the ports.

A final embodiment of the splice closure system may comprise a central closure body, a pair of end caps situated at each end of the closure body and each end cap having at least one port for receiving a cable with the end caps and the closure body defining a volume of space within which a cable is to be spliced, a directional control device disposed within this volume, the directional control device comprising a conduit selectively inserted among the insulated conductors, a heat recoverable seal adhesively attached to at least one port on each of the end caps and means on the seals and the end caps for preventing milk-off of the seals from the ports.

The various splice closure systems may find use in pressurized or non-pressurized applications.

A final aspect of the invention relates to a method of forming a cable block for a cable having a plurality of insulated conductors. The method comprises separating the plurality of insulated conductors into a predetermined number of groups and selectively inserting void-filling material between the groups.

DETAILED DESCRIPTION OF THE INVENTION

According to the invention, there is disclosed a cable closure comprising a central closure body and a pair of structural foam end caps situated at each end of the closure body.

Further, according to the invention, is a cable closure comprising a central closure body, a pair of end caps situated at each end of the closure, each end cap having at least one port for receiving a cable, a heat recoverable seal adhesively attached to at least one port on each of the end caps, and means on the seals and the end caps for preventing milk-off of the seals from the ports.

Figure 1:
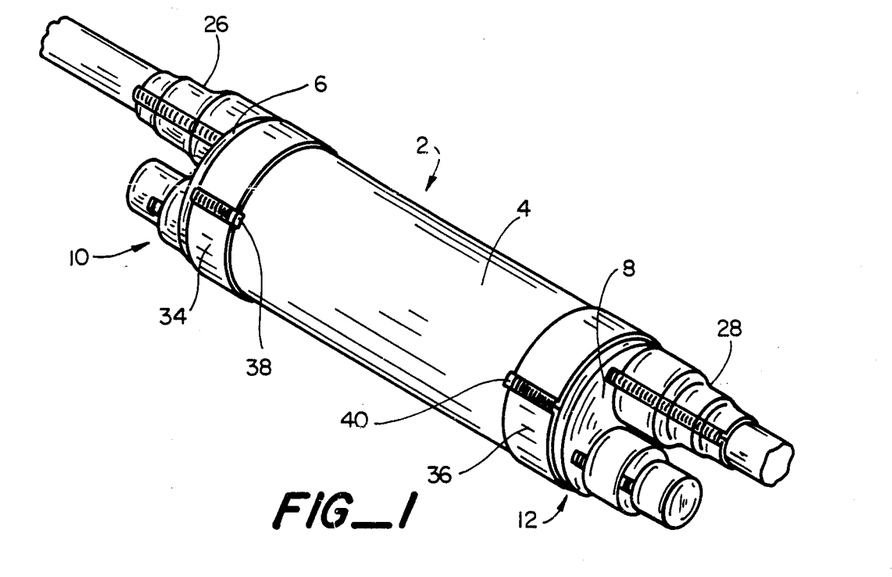
FIG. 1 is a perspective view of the assembled splice closure system according to the invention.
Figure 2:
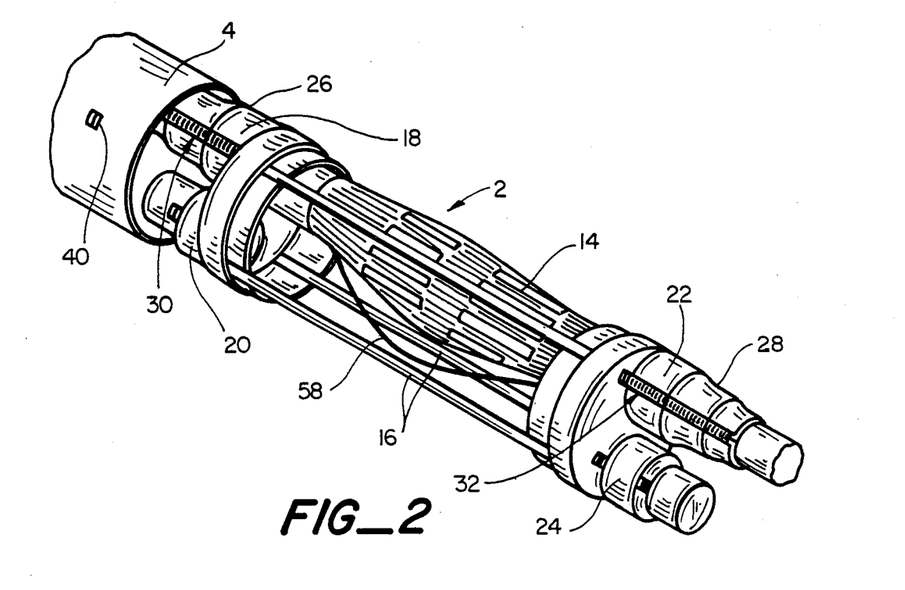
FIG. 2 is a perspective view of the splice closure system according to the invention with the central closure body removed.

Referring to the figures in more detail and particularly referring to FIGS. 1 and 2 there is shown a cable closure 2 which comprises a central closure body 4 and a pair of end caps 6, 8 situated at each end 10, 12, respectively, of the closure body.

It is preferred that the end caps be made from structural foam and most preferred that they be made from polypropylene structural foam. Other materials that will foam are also suitable for use with the invention. These other materials may include, for example, polyethylenes, polycarbonates and styrenes. Structural foam is preferred because the parts produced are lighter and more structurally perfect. Additionally warping of the part as would possibly occur in ordinary injection molding procedures wherein the part has a thick cross-section is avoided by using structural foam.

It has been found that the central closure body may advantageously be made from ultra high molecular weight polyethylene. Such a material is readily available in the form of low pressure gas pipe which has a shape and thickness ideally suited for the central closure body.

It is also preferred that at least one principal surface of each of the end caps is plated although usually the entire interior surface of the end cap will be plated. The plating material is unimportant and it may be, for example, zinc. The principal purpose of the plating material is to prevent, or at least to inhibit, moisture vapor transmission through the splice case. It may also be necessary or desirable to plate or otherwise lay a metallic foil within the central closure body for the same purpose.

It is well known that it is very difficult to get an adhesive to adhere to polypropylene. However, it has been found that adhesion is greatly enhanced when the surfaces, or at least portions thereof, to be adhered of the closure body and end caps undergo a surface preparation which comprises abrading, flame treating and/or priming with adhesive. By performing this surface preparation technique, adhesion is greatly improved.

With the central closure body 4 removed, the interior of the cable closure can be seen. Shown therein are the splices 14 and alignment bars 16. The interior may also comprise additional structure which will be discussed below.

It can be seen that each of the end caps in FIGS. 1 and 2 have two ports 18, 20, 22, 24 (four ports total) for receiving a cable. Of course, it may be desirable to have an end cap with more (or less) than two ports and this would be also contemplated within the scope of the invention. It can also be seen that these ports have a stepped outside diameter configuration. The purpose for this particular configuration is so that the ports may accept a variety of cables without changing the end cap. All that need be done is to cut off the end of the port at the appropriate location on the port. Where the cable passes through the port there is a heat recoverable seal 26, 28 attached thereto. The purpose of the seal is to seal the juncture between the cable and the port. Additionally, there are means generally indicated by 30, 32 on the seals and the end caps for preventing milk-off of the seals from the ports. This means will be described in more detail shortly.

The cable closure 4 may further comprise a pair of larger heat recoverable seals 34, 36, as shown in FIG. 1, adhesively attached to, and sealing the joint between, each of the end caps 6, 8 and the central closure body 4. There may also be means generally denoted by 38, 40, on the larger seals and the central closure body for preventing milk-off of the seals from the central closure body. Again, this means for preventing milk-off of the seals will be discussed in more detail shortly. Although not shown, the anti-milk-off means may alternatively be on the larger seals and the end caps.

It is most preferred that the heat recoverable seals be wrap-around electrically-heated heat recoverable seals. Such seals are well known to those skilled in the art and are readily available from the Raychem Corporation, the assignee of the instant application.

Figure 6:
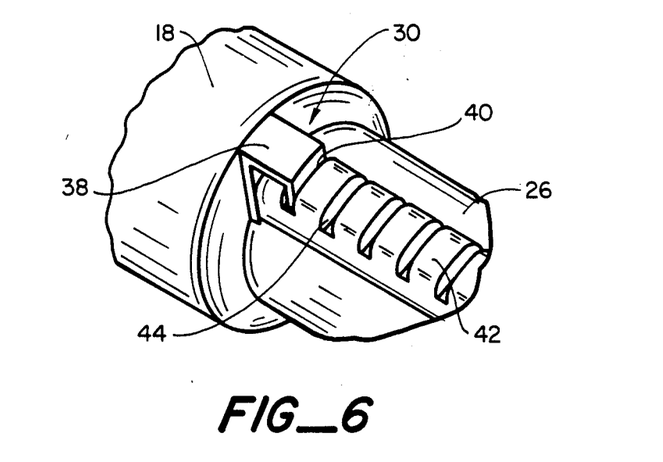
FIG. 6 is an enlarged perspective view of an anti-milk-off means according to the invention.

Referring now to FIG. 6 there is shown in more detail the means for preventing milk-off of the seals from the cable closure. Milk-off, of course, is a phenomenon in which a heat shrinkable sleeve migrates from its intended position to a smaller dimension or diameter. It would be highly desirable to prevent this phenomenon from occurring. For clarity, the heat recoverable seal 26 is shown to be situated only on the smaller diameter of the port 18. It can be seen that the anti-milk-off means 30 comprises a hook 38 on one of the seal and the end cap and a mating receptacle 40 on the other of the seal and end cap. Usually the hook will be on the end cap and the mating receptacle will be on the seal. When this latter case is, in fact, the situation a conventional wrap-around electrically-heated heat recoverable seal may be used. These types of wrap-around seals are typically formed by wrapping a piece of conductive polymer around the substrate and are closed by a channel 42. This channel has slots 44 transverse to its longitudinal axis. When the heat recoverable seal is assembled and placed on the end cap, and *before* heating, it may then be simply rotated until one of the transverse slots register with the hook on the end cap. At this point, the anti-milk-off means is in position. All that need be done now is to heat the heat recoverable seal. The heat recoverable seal may, and preferably will, have a hot melt adhesive on the interior of the heat recoverable seal which aids in the sealing. The melted adhesive would promote the milking-off of the seal. However, the anti-milk-off means prevents the seal from milking-off the end cap as would ordinarily occur without the anti-milk-off means. The anti-milk-off means on the larger seals and the central closure body would work in an identical manner.

According to the invention there is also disclosed a block for a cable having a plurality of insulated conductors comprising void-filling material selectively inserted among the insulated conductors. Such a block will have most application to a filled cable.

Those skilled in the art know that a filled cable is typically used for non-pressurized telephone plant. The filling material of the cable may be petroleum jelly or may be FLEXGEL ® (trademarked product of Western Electric). Ordinarily, such a block will be unnecessary for an unfilled cable since such a cable is usually pressurized.

Figure 3:
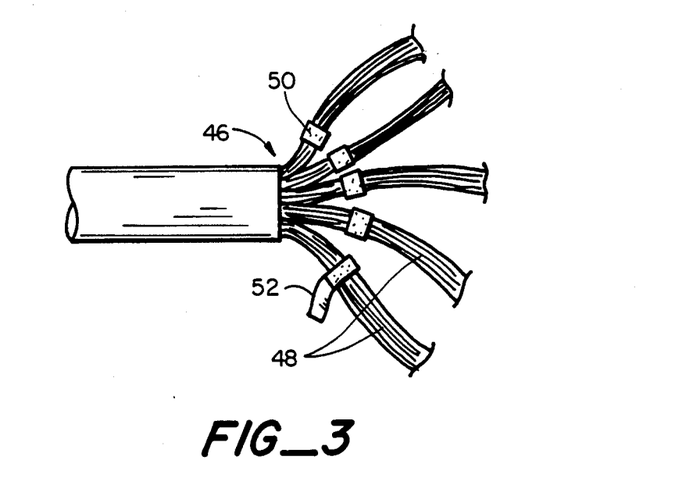
FIG. 3 is a perspective view of one cable end showing the formation of the cable block according to the invention.
Figure 4:
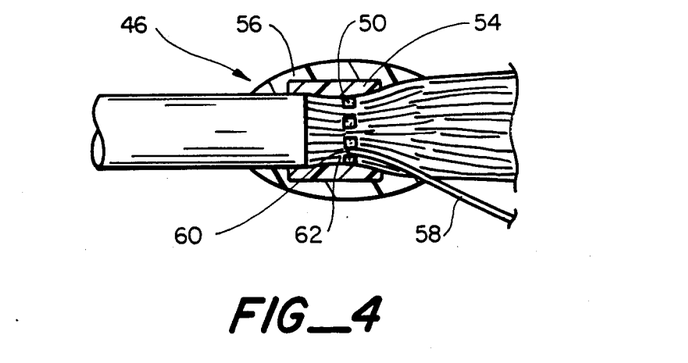
FIG. 4 is a plan view partly in section of a cable end showing a completed cable block according to the invention.

The block generally denoted by 46 can be seen in more detail by referring to FIGS. 3 and 4. As can be seen in FIG. 3, the block is formed by separating a plurality 48 of insulated conductors into a predetermined number of groups and then selectively inserting void-filling material 50 between the groups. This void-filling material may be as crude as sticks inserted between the groups so as to take up the voids between the groups. However it is preferred that each of the groups be wrapped as shown at 52 with a particular type of material that is found to work more satisfactorily. This particular type of material is preferably foam rubber and more preferably is foam rubber that is made from an ethylene propylene rubber such as EPDM. It has further been found that insulation weather stripping works very well also. It is expected that each of the different groups will be wrapped a number of times with the void-filling material. Wrapping can be done using the strip in a continuous form by wrapping the center most group first, then laying in and wrapping additional groups one by one until all the groups have been included and the strip wrapped around the entire circumference of the bundle of conductors.

It is also expected that a combination of foam rubber, weather stripping or similar material and a gel will work very well. The gel can comprise a grease, but most preferably comprises a three-dimensional molecular structure having a cone penetration between 100 and 350 ($10^{-1}$ mm) and an ultimate elongation of at least 200%, such structures being formable out of urethane, silicone, or a non-silicon liquid rubber. Such gels are described and claimed in copending application Ser. Nos. 434,011 filed Oct. 12, 1982 (now U.S. Pat. No.4,600,261); 504,000, filed June 13, 1983 (now U.S. Pat. No. 4,634,207);507,435 filed June 23, 1983 (a continuation of a continuation of which is now U.S. Pat. No. 4,643,924), the disclosures of which are incorporated herein by reference.

Due to the fact that the insulated conductors in a filled cable are covered with a greasy type material such as the petroleum jelly or FLEXGEL, mentioned above, the void-filling material may tend to migrate. Accordingly, it is desirable that there be applied a restraining means for applying a restraining force with respect to the void-filling material. The restraining means is positioned around the void-filling material. This restraining means may be something as simple as glass tape. However, it is more preferred that the restraining means comprises a compressive means for applying a compressive force with respect to the void-filling material. This compressive means is preferably PERMAWRAP tape or, alternatively DR tape (well-known to those skilled in the art as double rubber or self-amalgamating tape). Referring now to FIG. 4, it can be seen that there is applied a layer 54 of PERMAWRAP tape around the cable block. It has been found in practice that about 35 wraps of the PERMAWRAP tape will suffice. Over a period of time, the PERMAWRAP tape will relax so it is desirable to apply a further layer, preferably a rigid layer, which will constrain the PERMAWRAP tape and prevent its relaxation. This further layer may simply be hose clamps. However, this further layer 56, as shown in FIG. 4, is preferably SCOTCHCAST ® cast material (available from Minnesota Mining & Manufacturing Company) which is nothing more than an air hardenable compound in tape form identical to the tape doctors use to form a cast to repair a broken bone. This SCOTCHCAST material is simply wrapped around the block so as to completely encase the PERMAWRAP tape. Upon hardening a complete block is formed. Finally, in lieu of the SCOTCHCAST material, there may be substituted a wrap-around electrically-heated heat-recoverable sleeve.

Quite surprisingly, it has been found that the above-described block works very well in practice.

While the just-discussed block has most applicability to, and is preferred for use with, filled cable, its applicability to unfilled cable is nevertheless contemplated within the scope of the invention.

As further shown in FIG. 4, the block may also comprise a directional control device 58. This directional control device consists of a conduit selectively inserted among the insulated conductors and proximate to the void-filling material. Normally, this directional control device will extend at least to some point 60 behind the block. The conduit takes the water that would ordinary build up a water head behind the block. and transports it away from the block and, by means discussed later, disposes of it in a harmless way. By transporting the water away from the block the transmission of water through the block and into the splice is thereby avoided. It is noticed that the directional control device is positioned at the bottom 62 of the block. This is most desirable (although not absolutely necessary) since water will normally build up first at the bottom of the cable and so by removing it there first, a substantial build up of water is prevented.

Figure 5:
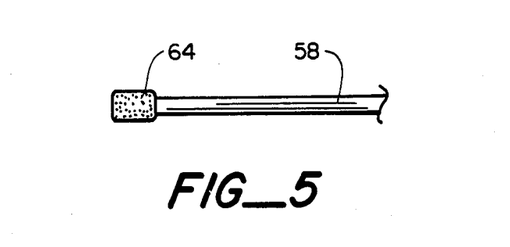
FIG. 5 is a plan view of a directional control device according to the invention.

The directional control device is shown in more detail in FIG. 5. The conduit merely consists of a piece of polymeric tubing such as polyethylene, Nylon or other material. It is preferred that the conduit have a filter means 64 on one end so as to prevent clogging of the conduit. It has been found that a porous material such as sintered high density polyethylene (commercially available from Porex Technologies) works very satisfactorily for this purpose. It has been found that the directional control device works best when the surface of the conduit in the area of the block is abraded and primed with polyurethane.

It is expected that the directional control device will be used in the block. However, it is contemplated within the scope of the invention that the directional control device may at times be used without the block and thus may be sold as a separate article of commerce.

There is also disclosed according to the invention a block for a cable having a plurality of insulated conductors comprising void-filling material selectively inserted among the insulated conductors, restraining means for applying a restraining force with respect to the void-filling material and positioned around the void-filling material, a directional control device comprising a conduit selectively inserted among the insulated conductors and proximate to the void-filling material and means for sensing water in proximity to the void-filling material. Such a block would be suitable for a filled or unfilled cable.

Figure 7:
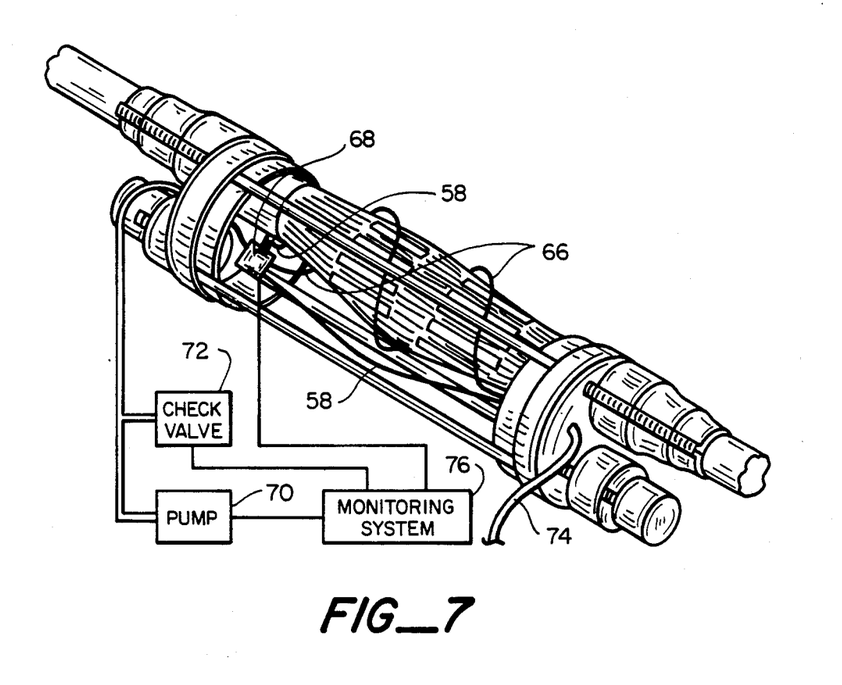
FIG. 7 is a perspective view partly in schematic showing the splice closure system according to the invention with the central closure body removed.

This block is similar to the block shown in FIG. 4 in that there is the void-filling material, a restraining means and also the directional control device. However, this embodiment further includes means for sensing water in proximity to void-filling material or elsewhere in the closure. Referring now to FIG. 7 there is shown such a means 66 for sensing water. This means senses any water which has gotten into or past the block. One type of water sensing means suitable for use with the invention is TraceTek ®, available from Raychem Corporation, which can sense water incrementally along its length. It is useful to separately sense and monitor the presence or absence of water in each cable coming into the splice closure area through the directional control device as well as separately detecting the presence of water in the splice closure itself.

It is contemplated that the cable closure would have a manifold 68 which would serve several purposes. One purpose of the manifold would be that the directional control device 58 could be inserted into the manifold and then proceed outwardly therefrom to the other cable block. However, there would also be a water sensing means, such as TraceTek, attached to the manifold which would serve to sense the water in the directional control device (and thus any water proximate to the void-filling material) and also any water that happens to be in the cable closure itself.

It is preferred that there be some means for removing the water from the directional control device. The reason of course for removing the water is that if it is not removed, the water will eventually backup behind the block to such a degree as to cause the block to fail. Upon failure, water will pass through the block and into the splice thereby damaging the splice. The means for removing water from the directional control device may be any of several means including, but not limited to, a pump 70, a check valve 72 or even a manually operated drain valve 74. While the pump and check valve are shown external to the closure, it is within the scope of the invention to have them internally located. When this is the case, a conduit for communicating with the outside of the closure may be provided.

FIG. 7 shows schematically a complete system for sensing and monitoring the operation of the cable block.

Already discussed in FIG. 7 is the water sensing means such as the TraceTek. However, there may also be provided a telephone monitoring system 76, which may be addressable or non-addressable. Such a monitoring system is readily available from the Sparton Corporation, among others. The monitoring system may in general be used to monitor any or all of the pump, check valve, manually operated drain valve or directional control device. The monitoring means may further be used to monitor the water sensing means. In this way an operator at a remote location may determine the exact state of the cable closure and block in operation and further determine whether any water has penetrated the system and in fact to what extent.

The previously discussed embodiments of the cable closure and the cable block may now be combined into a splice closure system as disclosed in the previously described Figures. This splice closure system may comprise any of several embodiments. Thus, according to the invention, one embodiment of the splice closure system for a cable having a plurality of insulated conductors comprises a central closure body, a pair of structural foam end caps situated at each end of the closure body with the end caps and closure body defining a volume of space in which a cable is to be spliced and at least one cable block disposed within this volume, the cable block comprising void-filling material selectively inserted among the insulated conductors.

This embodiment of the invention may fruther comprise a directional control device comprising a conduit selectively inserted among the insulated conductors and proximate to the void-filling material.

There is also disclosed according to the invention a splice closure system for a cable having a plurality of insulated conductors comprising a central closure body, a pair of structural foam end caps situated at each end of the closure body, the end caps and the closure body defining a volume of space in which a cable is to be spliced, and a directional control device disposed within this volume, the directional control device comprising a conduit selectively inserted among the insulated conductors.

A further embodiment according to the invention is a splice closure system for a cable having a plurality of insulated conductors comprising a central closure body, a pair of end caps situated at each end of the closure body, each end cap having at least one port for receiving a cable, the end caps and the closure body defining a volume of space within which a cable is to be spliced. This splice closure system may further comprise at least one cable block disposed within this volume, the cable block comprising void-filling material selectively inserted among the insulated conductors, a heat recoverable seal adhesively attached to at least one port on each of the end caps and finally, means on the seals and the end caps for preventing milk-off of the seals from the ports.

This embodiment of the splice closure system may also comprise a directional control device comprising a conduit selectively inserted among the insulated conductors and proximate to the void-filling material.

In the final embodiment of the splice closure system, there is disclosed a splice closure system for a cable having a plurality of insulated conductors. The system comprises a central closure body, a pair of end caps situated at each end of the closure body, each end cap having at least one port for receiving a cable, the end caps and closure body defining a volume of space within which a cable is to be spliced, and a directional control device disposed within the volume, the directional control device comprising a conduit selectively inserted among the insulated conductors. This system further comprises a heat recoverable seal adhesively attached to at least one port on each of the end caps and means on the seals and end caps for preventing milk-off of the seals from the ports.

The various closure systems may also comprise a pair of larger heat recoverable seals adhesively attached to, and sealing the joint between, each of the end caps and the central closure body and means on the larger seals and central closure body for preventing milk-off of the seals from the central closure body. It is also preferred that the various heat recoverable seals are of the wrap-around type which are preferably electrically heat recoverable.

It is preferred that the prevention means comprise a hook on one of the seal and end cap and a mating receptacle on the other of the seal and end cap. With respect to the larger seals, it is preferred that the prevention means comprise a hook on one of the seal and central closure body and a mating receptacle on the other of the seal and closure body.

As discussed previously, the closure systems may comprise a restraining means and most preferably a compressive means for applying a compressive force with respect to the voidfilling material. Also as discussed previously, the closure systems may comprise various means for sensing water within the volume of the cable closure and for monitoring the water sensing means. There may also be means for removing water from the conduit as well as means for monitoring the directional control device and the water removal means.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A cable closure comprising:
   (i) a central closure body;
   (ii) two end caps that can be situated one at each end of the closure body, said end caps each having at least one port for receiving a cable;
   (iii) two heat-recoverable seals which can be adhesively attached to the at least one port on a respective said end cap; and
   (iv) a means for preventing milk-off for each said seal from the ports, each of the means for preventing being selected from the group consisting of (a) a hook on the seal and a mating receptacle on the respective end cap and (b) a hook on the respective end cap and a mating receptacle on the seal.

2. A closure according to claim 1, further comprising:
   (v) two larger heat-recoverable seals which can be respectively adhesively attached to, and seal a joint between, respective said end caps and said central closure body; and means on said larger seals and said central closure body for preventing milk-off of said larger seals from said central closure body.

3. A closure according to claim 2, in which each of the means for preventing milk-off of said larger seals (v) is selected from the group consisting of (a) a hook on a larger seal (v) and a mating receptacle on the central closure body and (b) a hook on the central closure body and a mating receptacle on a larger seal (v).

4. A closure according to claim 1, in which each of the seals (iii) comprises a wraparound electrically-heatable seal.

5. A closure according to claim 2, in which each of the seals (v) comprises a wrap-around electrically-heatable seal.

6. A closure according to claim 1, further comprising:
   (vi) at least one void-filling material that can be disposed within a volume defined by the closure body and end caps and that can be selectively inserted among insulated conductors of a multi-core cable.

7. A closure according to claim 1, further comprising:
   (vii) a directional control device that can be disposed within a volume defined by the closure body, the device comprising a conduit capable of being selectively inserted among insulated conductors of a multi-core cable.

8. A closure according to claim 1, in which said end caps (ii) comprise a structural foam.

9. A closure according to claim 8, in which said structural form is polypropylene.

10. A closure according to claim 6, which additionally comprises:
    (viii) restraining means that can be positioned around said material (vi) thereby applying a compressive restraining force to said material (vi).

11. A closure according to claim 1, which additionally comprises:
    (ix) means for sensing water within the closure.

12. A splice closure system for a cable having a plurality of insulated conductors, the system comprising:
    (i) a central closure body;
    (ii) two end caps that can be situated one at each end of said closure body, said end caps each having at least one port for receiving a cable, said end caps and said closure body defining a volume of space within which a cable is to be spliced;
    (iii) at least one cable block that can be disposed within said volume, said cable block comprising void-filling material capable of being inserted among insulated conductors of a cable;
    (iv) two heat-recoverable seals which can be adhesively attached to at least one port on a respective said end cap;
    (v) means on said seals (iv) and said end caps for preventing milk-off of said seals (iv) from the ports;
    (vi) two larger heat-recoverable seals that can be respectively adhesively attached, and sealing a joint between respective said end caps and said central closure body; and
    (vii) a means for preventing milk-off of each said larger seal (vi) from said central closure body, the means for preventing (vii) being selected from a group consisting of (a) a hook on the larger seal (vi) and a mating receptacle on the central closure body and (b) a hook on the central closure body and a mating receptacle on the larger seal (vi).

13. A splice closure system for a cable having a plurality of insulated conductors, the system comprising:
    (i) a central closure body;
    (ii) two end caps that can be situated one at each end of said closure body, said end caps each having at least one port for receiving a cable, said end caps and said closure body defining a volume of space within which a cable is to be spliced;

(iii) a direction control device that can be disposed within said volume, said directional control device comprising a conduit capable of being selectively inserted among insulated conductors of a cable;
(iv) two heat-recoverable seals which can be adhesively attached to at least one port on a respective said end cap;
(v) means on said seals (iv) for preventing milk-off of said seals (iv) from the ports;
(vi) two larger heat-recoverable seals that can be respectively adhesively attached to, and sealing a joint between respective said end caps and said central closure body; and
(vii) means for preventing milk-off of each said larger seals (vi) from said central closure body, the means for preventing (vii) being selected from a group consisting of (a) a hook on the larger seal (vi) and a mating receptacle on the central closure body and (b) a hook on the central closure body and a mating receptacle on the larger seal (vi).

* * * * *

UNITED STATES PATENT AND TRADEMARK OFFICE
CERTIFICATE OF CORRECTION

PATENT NO. : 4,769,513

DATED : September 6, 1988

INVENTOR(S) : Glen W. Ragland, et al.

It is certified that error appears in the above-identified patent and that said Letters Patent is hereby corrected as shown below:

Column 5, line 65 please change "non-silicon" to "non-silicone"

Column 6, line 12 change "Ihis" to "This"

Column 7, line 9 after "block" please insert --described above.--

Signed and Sealed this

Thirteenth Day of April, 1993

*Attest:*

STEPHEN G. KUNIN

*Attesting Officer*   *Acting Commissioner of Patents and Trademarks*